US012684299B2

(12) United States Patent
Seeger et al.

(10) Patent No.: US 12,684,299 B2
(45) Date of Patent: Jul. 14, 2026

(54) ELECTRODES FOR MICROELECTROMECHANICAL SYSTEM MICROPHONES

(71) Applicants: INVENSENSE, INC., San Jose, CA (US); TDK ELECTRONICS AG, Munich (DE)

(72) Inventors: Joseph Seeger, Menlo Park, CA (US); Dennis Mortensen, Bagsvaerd (DK)

(73) Assignees: INVENSENSE, INC, San Jose, CA (US); TDK ELECTRONICS AG, Munich (DE)

( * ) Notice: Subject to any disclaimer, the term of this patent is extended or adjusted under 35 U.S.C. 154(b) by 281 days.

(21) Appl. No.: 18/448,601

(22) Filed: Aug. 11, 2023

(65) Prior Publication Data

US 2024/0171917 A1 May 23, 2024

Related U.S. Application Data

(60) Provisional application No. 63/507,218, filed on Jun. 9, 2023, provisional application No. 63/384,791, filed on Nov. 23, 2022.

(51) Int. Cl.

| | |
|---|---|
| ***H04R 19/04*** | (2006.01) |
| ***H04R 7/04*** | (2006.01) |
| ***H04R 7/18*** | (2006.01) |

(52) U.S. Cl.

CPC ............... *H04R 19/04* (2013.01); *H04R 7/04* (2013.01); *H04R 7/18* (2013.01); *H04R 2201/003* (2013.01); *H04R 2410/03* (2013.01)

(58) Field of Classification Search

CPC ............ H04R 19/005; H04R 2201/003; B81B 2203/019; B81B 2203/0353; B81B 2203/04

See application file for complete search history.

(56) References Cited

U.S. PATENT DOCUMENTS

| | | | |
|---|---|---|---|
| 8,327,711 | B2 | 12/2012 | Kasai et al. |
| 8,731,220 | B2 | 5/2014 | Zhang et al. |

(Continued)

FOREIGN PATENT DOCUMENTS

| | | | |
|---|---|---|---|
| CN | 206923039 | U | 1/2018 |
| CN | 109286884 | A | 1/2019 |

(Continued)

OTHER PUBLICATIONS

Communication Pursuant to Article 94(3) EPC received for EP Patent Application Serial No. 21194006.9 dated Apr. 29, 2024, 5 pages.

(Continued)

*Primary Examiner* — Sunita Joshi

(74) *Attorney, Agent, or Firm* — Amin, Turocy & Watson, LLP

(57) ABSTRACT

The present invention relates to split electrodes for microelectromechanical system (MEMS) microphones. In one embodiment, a MEMS sensor includes a membrane, a membrane electrode formed in a portion of the membrane, and a backplate situated parallel to the membrane and separated by a gap. The backplate includes a first region of the backplate, where the first region of the backplate has first perforations of a first density, a backplate electrode is formed in a portion of the first region of the backplate, and a portion of the membrane electrode overlaps a portion of the backplate electrode in a sensing region forming a sensing capacitor, the sensing capacitor being configured to sense motion of the membrane in response to acoustic pressure. The backplate also includes a second region of the backplate having second perforations of a second density, where the second density is greater than the first density.

40 Claims, 15 Drawing Sheets

(56) References Cited

U.S. PATENT DOCUMENTS

| | | | |
|---|---|---|---|
| 9,549,263 | B2 | 1/2017 | Uchida |
| 10,555,089 | B2 | 2/2020 | Inoue |
| 11,180,361 | B2 | 11/2021 | Fueldner et al. |
| 11,490,186 | B2 | 11/2022 | Tang et al. |
| 11,528,546 | B2 | 12/2022 | Lin et al. |
| 2007/0286438 | A1 | 12/2007 | Hirade et al. |
| 2010/0212432 | A1 | 8/2010 | Kasai et al. |
| 2013/0056840 | A1 | 3/2013 | Bominaar-Silkensandres et al. |
| 2013/0223023 | A1 | 8/2013 | Dehe et al. |
| 2013/0264663 | A1 | 10/2013 | Dehe et al. |
| 2015/0104048 | A1 | 4/2015 | Uchida et al. |
| 2016/0195567 | A1 | 7/2016 | Tanaka |
| 2018/0103324 | A1 | 4/2018 | Yoo |
| 2019/0116427 | A1* | 4/2019 | Inoue .................... B81B 3/0072 |
| 2019/0273993 | A1 | 9/2019 | Dehe et al. |
| 2020/0213773 | A1 | 7/2020 | Naderyan et al. |
| 2020/0290864 | A1 | 9/2020 | Fueldner et al. |
| 2022/0070568 | A1 | 3/2022 | Tang et al. |
| 2024/0171917 | A1 | 5/2024 | Seeger et al. |

FOREIGN PATENT DOCUMENTS

| | | | | |
|---|---|---|---|---|
| CN | 114845227 | A | 8/2022 | |
| DE | 10 2010 035 168 | A1 | 2/2012 | |
| DE | 102013203379 | A1 * | 8/2013 | ............. H10D 48/50 |
| DE | 102013203379 | B4 * | 9/2020 | ............. H10D 48/50 |
| EP | 2 071 871 | A1 | 6/2009 | |
| EP | 3 114 857 | B1 | 12/2017 | |
| WO | 03/068668 | A2 | 8/2003 | |
| WO | WO-2014159552 | A1 * | 10/2014 | ......... B81C 1/00246 |
| WO | 2024/112406 | A1 | 5/2024 | |

OTHER PUBLICATIONS

Notice Allowance received for U.S. Appl. No. 17/211,512 dated Jun. 22, 2022, 30 pages.

Non-Final office action received for U.S. Appl. No. 17/211,512 dated Mar. 31, 2022, 24 pages.

Communication Pursuant to Rule 69 EPC received for EP Patent Application Serial No. 21194006.9 dated Mar. 7, 2022, 2 pages.

Extended European Search Report received for European Patent Application Serial No. 21194006.9 dated Feb. 2, 2022, 11 pages.

International Search Report and Written Opinion received for PCT Application Serial No. PCT/US2023/036344 dated Apr. 12, 2024, 20 pages.

International Preliminary Report on Patentability dated May 27, 2025 for International Application No. PCT/US2023/036344.

Communication Pursant to Rules 161(1) and 162 EPC received for EP Patent Application serial No. 23813952.1 dated Jul. 1, 2025, 3 pages.

International Search Report and Written Opinion received for PCT Application Serial No. PCT/US2025/012317 dated Aug. 28, 2025, 31 pages.

Notification of Review Opinions from the Intellectual Property Office, Ministry of Economic Affairs for TW Application Serial No. 112145184 dated Apr. 24, 2026.

* cited by examiner

ELECTRODES FOR MICROELECTROMECHANICAL SYSTEM MICROPHONES

CROSS-REFERENCE TO RELATED APPLICATIONS

The present application claims the benefit of priority to U.S. Provisional Patent Application No. 63/384,791, filed Nov. 23, 2022, and entitled "SPLIT ELECTRODES FOR MICROPHONES," and U.S. Provisional Patent Application No. 63/507,218, filed Jun. 9, 2023, and entitled "SPLIT ELECTRODES FOR MICROPHONES," the entirety of which applications is incorporated herein by reference.

TECHNICAL FIELD

The subject disclosure generally relates to microelectromechanical system (MEMS) devices, and more particularly to MEMS microphones.

BACKGROUND

MEMS microphones typically have a diaphragm that forms a variable capacitor with an underlying backplate. Receipt of an audible signal causes the diaphragm to vibrate, consequently generating a variable capacitance signal representing the audible signal. It is this variable capacitance signal that can be amplified, recorded, or otherwise transmitted to another electronic device.

There are three sources of noise in a MEMS microphone, namely the application-specific integrated circuit (ASIC), MEMS, and package. Noise caused by one or more of these sources can degrade the quality of the variable capacitance signal noted above, e.g., in terms of a signal-to-noise ratio (SNR) and/or other metrics. The diaphragm of a MEMS microphone is generally constructed as a membrane consisting of one or more layers, and damping between this membrane and the backplate can be a cause of MEMS noise. It is therefore desirable to implement techniques to improve MEMS SNR, and/or reduce noise caused by the MEMS and/or other sources, in a MEMS microphone.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1A:
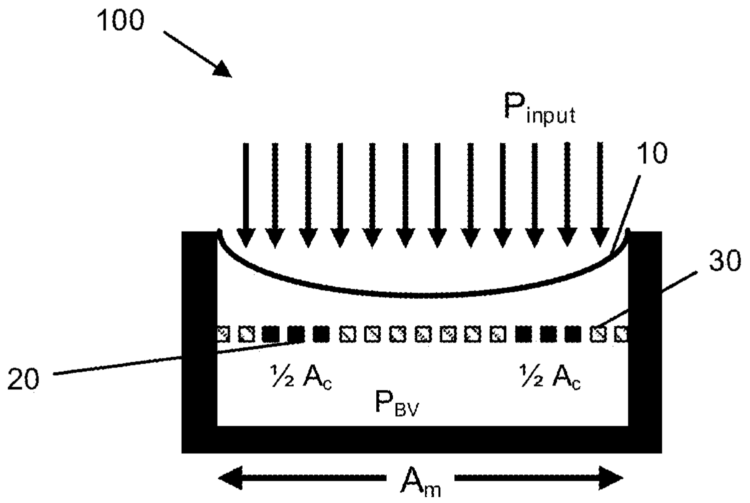
FIG. 1A is a cross sectional diagram depicting response to acoustic pressure in an example MEMS microphone or acoustic sensor as described herein.

One or more aspects of the present disclosure are generally directed toward MEMS microphones and components thereof, such as a membrane and/or backplate. By employing various implementations as described herein, the performance of a MEMS microphone can be improved in terms of signal quality, as measured via a signal-to-noise ratio (SNR) and/or other metrics, by reducing the amount of noise contributed by the MEMS acoustic sensor associated with the microphone.

As used herein, microelectromechanical (MEMS) systems can refer to any of a variety of structures or devices fabricated using semiconductor-like processes and exhibiting mechanical characteristics such as the ability to move or deform. For instance, such structures or devices can interact with electrical signals. As a non-limiting example, a MEMS acoustic sensor can include a MEMS transducer and an electrical interface. In addition, MEMS structures or devices can include, but are not limited to, gyroscopes, accelerometers, magnetometers, environmental sensors, pressure sensors, acoustic sensors or microphones, and radio-frequency components.

In one aspect disclosed herein, a MEMS sensor, e.g., a MEMS acoustic sensor, includes a membrane, a membrane electrode formed in a portion of the membrane, and a backplate situated parallel to the membrane and separated by a gap. The backplate includes a first region of the backplate, where first perforations of a first density are formed in the first region, a backplate electrode is formed in a portion of the first region, and a portion of the membrane electrode overlaps a portion of the backplate electrode in a sensing region forming a sensing capacitor. The sensing capacitor is configured to sense motion of the membrane in response to acoustic pressure. The backplate also includes a second region of the backplate into which second perforations of a second density are formed, where the second density is greater than the first density.

In another aspect disclosed herein, a MEMS sensor, e.g., a MEMS acoustic sensor, includes a membrane, a membrane electrode formed in a portion of the membrane, a backplate situated parallel to the membrane and separated from the membrane by a gap, and a backplate electrode formed in a portion of the backplate. The membrane electrode at least partially overlaps the backplate electrode in a sensing region forming a sensing capacitor. The MEMS sensor also includes a sensing circuit coupled to the sensing capacitor and configured to sense motion of the membrane in response to acoustic pressure. Additionally, the sensing region is situated away from a point of maximum motion of the membrane in response to acoustic pressure.

In still another aspect disclosed herein, a MEMS acoustic sensor includes a membrane, a membrane electrode formed in a portion of the membrane, and a backplate situated parallel to the membrane and separated by a gap. The backplate includes a first region of the backplate having first perforations of a first density, a second region of the backplate having second perforations of a second density that is greater than the first density, and a backplate electrode formed in a portion of the backplate. A portion of the membrane electrode overlaps a portion of the backplate electrode in a sensing region forming a sensing capacitor, and the sensing capacitor is configured to sense motion of the membrane in response to acoustic pressure. The first region of the backplate encloses a point of maximum motion of the membrane in response to acoustic pressure, and the second region of the backplate is situated away from the point of maximum motion of the membrane in response to the acoustic pressure.

Other embodiments and various examples, scenarios and implementations are described in more detail below. The following description and the drawings set forth certain illustrative embodiments of the specification. These embodiments are indicative, however, of but a few of the various ways in which the principles of the specification may be employed. Other advantages and novel features of the embodiments described will become apparent from the following description when considered in conjunction with the drawings.

With reference now to the drawings, various views of example MEMS microphone components are provided. It is noted that the drawings are not drawn to scale, either within a single drawing or between different drawings.

FIG. 1A is a simplified cross-section of an example MEMS acoustic sensor 100 that illustrates a response to acoustic pressure in a MEMS microphone. As shown in FIG. 1A, the sensor 100 can include a membrane 10 that flexes in response to air pressure, e.g., air pressure produced by an acoustic signal, represented in FIG. 1A as an input pressure. The area of the membrane 10 is represented in FIG. 1A as $A_m$. The membrane 10 is separated from a backplate 30 by a gap. Sensor 100 as depicted by FIG. 1A includes two backplate electrodes 20 where each electrode has a total area of ½ $A_c$, where $A_c$ is the total electrode area associated with the sensor 100. A backplate electrode 20 formed on the backplate 30 and a membrane electrode (not shown in FIG. 1A) formed on the membrane 10, forms a variable capacitor $C_{MEMS}$ that exhibits a capacitance change that depends on an amount of deflection of the membrane 10. An acoustic signal can then be captured by measuring the resulting capacitance change at respective backplate electrodes 20. The area of the sensor 100 between the membrane 10 and a housing of the sensor in which the backplate 30 is positioned is referred to as the back volume of the sensor 100, and the back volume pressure of the sensor 100 is represented as $P_{BV}$.

Because flexion of the membrane 10 causes displacement of air within the sensor 100, the backplate 30 can be perforated to enable the passage of air through the backplate. However, despite the presence of perforations, the backplate 30 can resist this passage of air. This resistance can, in turn, result in noise. Techniques for reducing MEMS noise caused via air resistance of the backplate presently exist, but each of these techniques are associated with drawbacks. For example, MEMS SNR can be improved by increasing the MEMS area (e.g., the area of the membrane and backplate), but increasing MEMS area leads to a bigger microphone die and increased production cost. As another example, hole spacing in the backplate can be reduced to allow greater airflow through the backplate, but this can reduce the signal produced by the sensor and can also compromise the mechanical strength of the backplate. As a further example, a vacuum can be formed between the membrane and backplate, but doing so significantly increases the complexity of the sensor, e.g., due to additional mechanical parts being needed to connect the membrane and backplate in the presence of a vacuum, as well as the process complexity of manufacturing the sensor and its associated cost.

To the furtherance of the foregoing and/or related ends, various embodiments described herein can reduce the impact of damping, air resistance, and/or other qualities of a MEMS sensor backplate to reduce noise associated with the backplate and increase device SNR. In some embodiments, a multi-region backplate can be used in which respective regions of the backplate have different perforation patterns, which can reduce the overall resistance of the backplate. In one example, a first region of a backplate can have holes or perforations of a first size or density, and a second, different region of the backplate can have holes or perforations of a second, different size or density. In another example, a backplate can be substantially smaller than its corresponding membrane, e.g., such that openings are formed in between backplate areas.

In other embodiments provided herein, sensing electrodes for a MEMS sensor are positioned away from a point of maximum motion of the membrane, e.g., a center of the membrane. Among other benefits, offset sensing electrodes used in this manner can reduce damping between the membrane and the backplate relative to a similar device utilizing centrally located electrodes.

While various examples are described herein relative to a MEMS acoustic sensor and associated microphone, it is noted that similar concepts to those described herein could also be applied to other types of sensors or devices. For instance, similar structures to those described herein could be utilized to improve the performance of capacitive pressure sensors, capacitive micromachined ultrasonic transducers (CMUTs), and/or any other capacitive MEMS sensor devices. It is noted that the description and claimed subject matter are not intended to be limited to any particular type(s) of sensors unless explicitly stated otherwise.

Figure 1B:
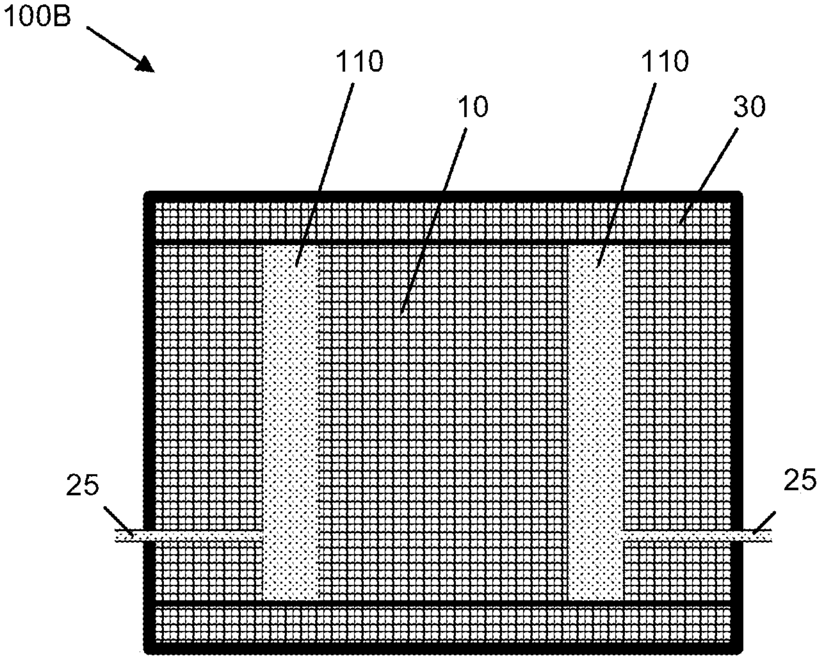
FIG. 1B is a diagram depicting a simplified top perspective view of a MEMS acoustic sensor configured in accordance with various embodiments of the disclosure.

Referring now to FIG. 1B, a simplified top perspective view of a MEMS sensor 100B, e.g., a MEMS acoustic sensor configured in accordance with various embodiments of the disclosure, is presented. It is noted that similar techniques to those described herein could be applied to MEMS sensors of other shapes, such as polygonal (e.g., hexagonal, octagonal, etc.), circular or elliptical, and/or other suitable shapes. Respective examples of circular MEMS sensors are described below with respect to FIGS. 11-15.

The MEMS sensor 100B shown in FIG. 1B includes a membrane 10, which can be composed of any material(s) suitable for enabling flexibility of the membrane 10. As shown, the membrane 10 can be clamped, anchored, and/or otherwise attached to one or more sides of the perimeter of the MEMS sensor 100B. Here, the membrane 10 is attached to the short edges of the sensor 100B, i.e., the left and right edges as shown in FIG. 1A. While the membrane 10 is shown as offset from the short edges of the sensor 100B for purposes of illustration, it is noted that in some embodiments the membrane 10 can span the entire length of the sensor 100B. It is noted that in FIG. 1B and the drawings that follow, the membrane 10 is shown as transparent for simplicity of illustration.

As further shown by FIG. 1B, respective electrodes can be formed into respective portions of the membrane 10, e.g., portions corresponding to sensing regions 110. For clarity, electrodes formed into the membrane 10 are referred to herein as membrane electrodes. As additionally shown by FIG. 1B, the MEMS sensor can include a backplate 30 that is situated parallel to the membrane 10, e.g., such that the membrane 10 is situated above the backplate 30 with respect to the view shown in FIG. 1B extending from the view shown in FIG. 1B in an out-of-page direction. Additionally, the membrane 10 can be separated from the backplate 30 by a gap in order to facilitate capacitive sensing as will be described below.

In some implementations, the backplate 30 can be attached or connected to the perimeter of the sensor 100B (e.g., associated with a sensor housing) orthogonally to the connection of the membrane. Thus, in the example shown by FIG. 1B, the membrane 10 can be anchored on the short sides of the perimeter of the sensor 100B, and the backplate 30 can be attached to the two long sides of the perimeter of the sensor 100B. Other techniques could also be used.

The backplate 30 shown in FIG. 1B can be perforated to include holes or openings in the backplate 30, as represented by the hatch pattern of the backplate 30 in FIG. 1B. While the backplate 30 shown in FIG. 1B has perforations of a single density (size), other implementations could include a backplate having distinct regions with different hole densities, or a discontinuous backplate that is substantially smaller than the membrane, as will be described in further detail below.

The backplate 30 shown in FIG. 1B can include respective electrodes, i.e., backplate electrodes 20, that are formed into a portion of the backplate 30. The backplate electrodes 20 can at least partially overlap the membrane electrodes described above in the respective sensing regions 110. As a result, the sensing regions 110 form a sensing capacitor that can be configured to sense motion of the membrane 10 in response to acoustic pressure. A voltage difference is applied between the sensing electrode and the backplate electrode in order to sense motion of the membrane due to acoustic pressure.

Motion of the membrane 10 causes a change in the gap between the membrane electrode and the backplate 30, which causes a change in capacitance between the membrane electrode and the backplate 30. As used herein, a sensing region 110 refers to a region of overlap, either between the membrane electrode and backplate or between the membrane and backplate electrode. The sensing regions 110 are electrically coupled to a sensing circuit via a connector 25. The connector 25 can be implemented by, for example, a routing region that includes an area of overlap of a backplate electrode and a membrane electrode, thereby forming a routing capacitor. The routing capacitor can be configured such that a change in the capacitance of the routing capacitor in response to acoustic pressure is less than a corresponding change of the capacitance of the sensing capacitor in response to the acoustic pressure.

As further shown in FIG. 1B, the sensing regions 110 are situated away from a point of maximum motion of the membrane in response to acoustic pressure, e.g., a center of the membrane 10. As a result, there are reductions to the signal produced by the deflection of the membrane as well as the amount of noise produced due to acoustic resistance of the backplate 30. The reduction in noise is greater than the reduction in signal, thereby resulting in better signal to noise ratio.

In the example shown by FIG. 1B, the respective sensing regions 110 are symmetrically offset relative to the center of the membrane 10, which can result in a signal captured by the sensor being approximately doubled relative to that which would be captured via a single sensing region 110. This can, for example, be used to compensate for reduced sensitivity associated with placing the sensing regions 110 in areas that exclude a point of maximum motion of the membrane 10. Sensitivity of the sensor shown in FIG. 1B could also be increased by increasing the compliance of the membrane 10, e.g., by reducing the amount of tension on the membrane 10. Other techniques for improving sensitivity could also be used, such as reducing the size of the gap between the membrane 10 and backplate 30, applying additional voltage difference between backplate 20 and the membrane 10, and/or other techniques.

Figure 2A:
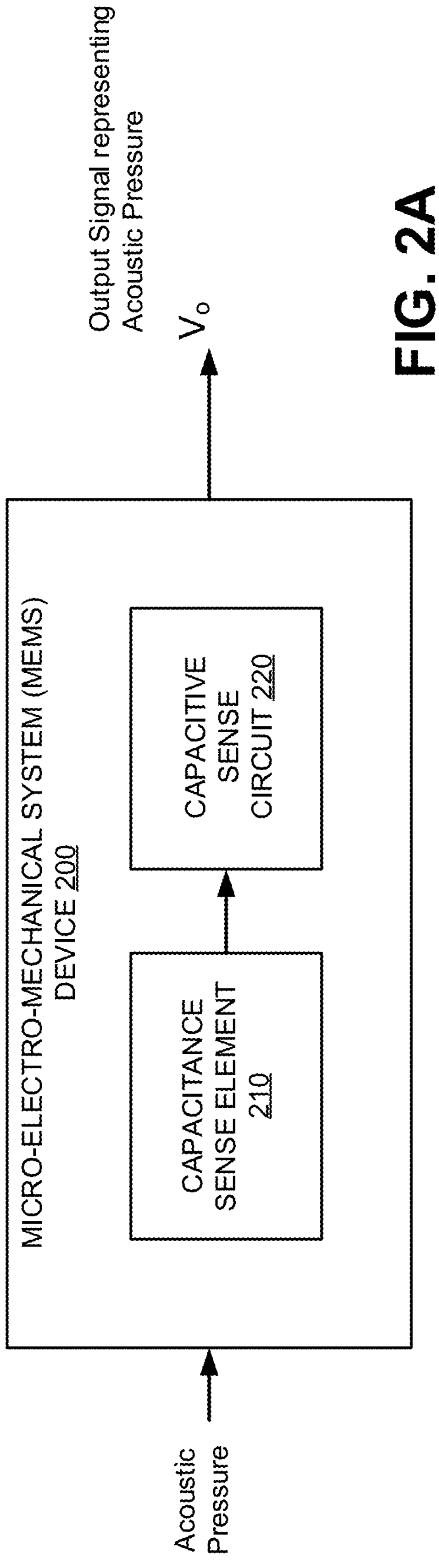
FIG. 2A is a block diagram depicting an example sensing circuit of a MEMS acoustic sensor.

FIG. 2A shows a block diagram of a MEMS acoustic sensor, here an acoustic sensor implemented via a MEMS device 200. The acoustic sensor includes a capacitive sense element 210, which can capacitively sense acoustic pressure applied to the MEMS device 200. In an embodiment, the capacitive sense element 210 can be implemented via an electrode formed into one of a membrane or backplate associated with the MEMS device 200 that overlaps with the other of the membrane and backplate, e.g., at a sensing region 110 as described above with respect to FIG. 1B. The capacitive sense element 210 is electrically coupled to a capacitive sense circuit 220, which can produce an output signal representing the acoustic pressure applied to the capacitive sense element 210.

Figure 2B:
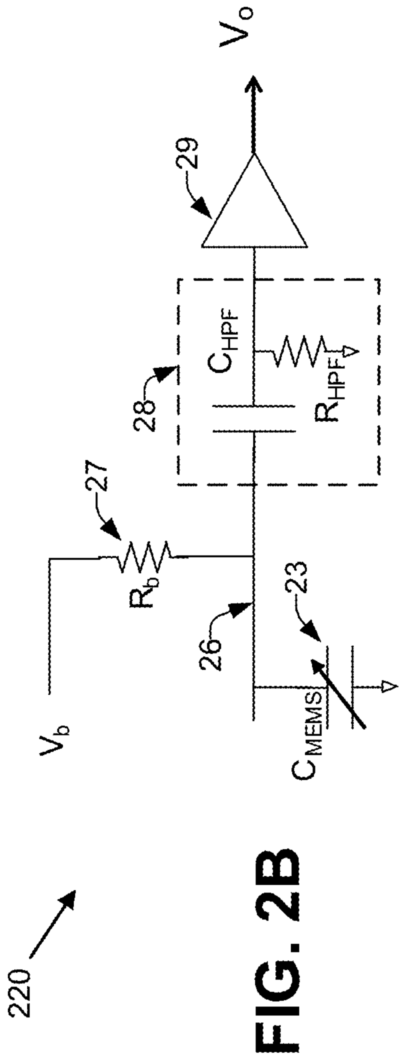
FIG. 2B is a circuit diagram depicting an example sensing circuit of a MEMS acoustic sensor.

FIG. 2B shows an example implementation of the capacitive sense circuit 220, which can measure the change in a MEMS capacitance 23 ($C_{MEMS}$) due to change in acoustic pressure. A bias voltage $V_b$ is applied to the sensing circuit 220, which feeds a bias resistance 27 as well as a sensing element 23 comprising a backplate electrode 20 and membrane electrode 10 26. In some embodiments, the sensing element 23 is electrically coupled to a high-pass filter (HPF) 28 that comprises a HPF resistance ($R_{HPF}$) and a HPF capacitance ($C_{HPF}$). The HPF 28 shown in FIG. 2B is electrically coupled to a unity gain buffer 29, which generates an output signal ($V_o$) of the capacitive sense circuit 220 in response to acoustic pressure.

Figure 3:
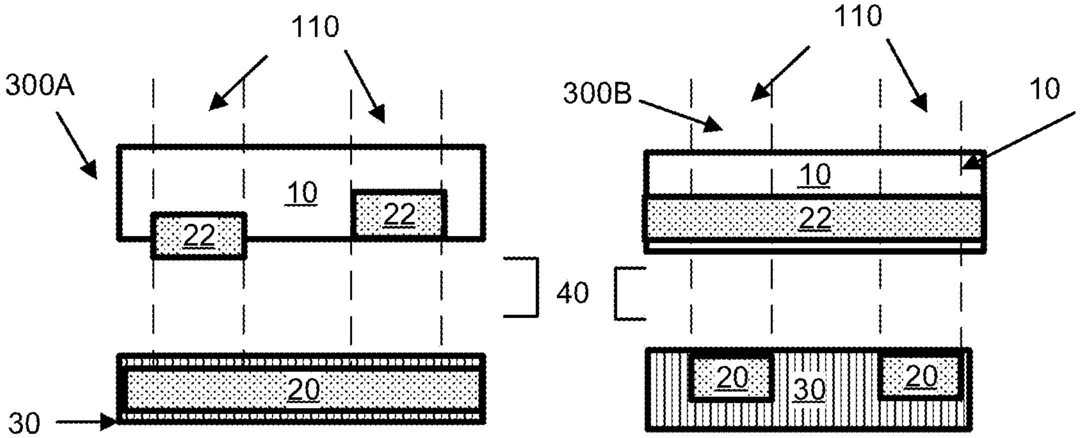
FIG. 3 is a diagram depicting a simplified side perspective view of the MEMS acoustic sensor shown in FIG. 1.

Turning now to FIG. 3, simplified side perspective views of the MEMS sensor 100B shown in FIG. 1B is depicted. As shown in FIG. 3, the membrane 10 and backplate 30 are separated by a gap 40, forming a variable capacitor that exhibits a capacitance related to an amount of acoustic pressure exerted on the membrane 10. The sensing regions 110 are formed by an overlap of electrodes in the membrane 10 and the backplate 30. In FIG. 3, electrodes formed on the membrane are denoted by 22. The capacitance of the sensing region 110, which corresponds to the overlap between membrane electrodes 22 and electrodes formed into the backplate 30, can be measured to obtain an acoustic signal. While the sensing region 110 are shown in FIG. 3 as separate from the membrane 10 and backplate 30, it is noted that the sensing regions 110 can be implemented via electrodes respectively formed into the membrane 10 and backplate 30. In other embodiments, electrodes can be formed on the membrane or backplate.

Figure 4:
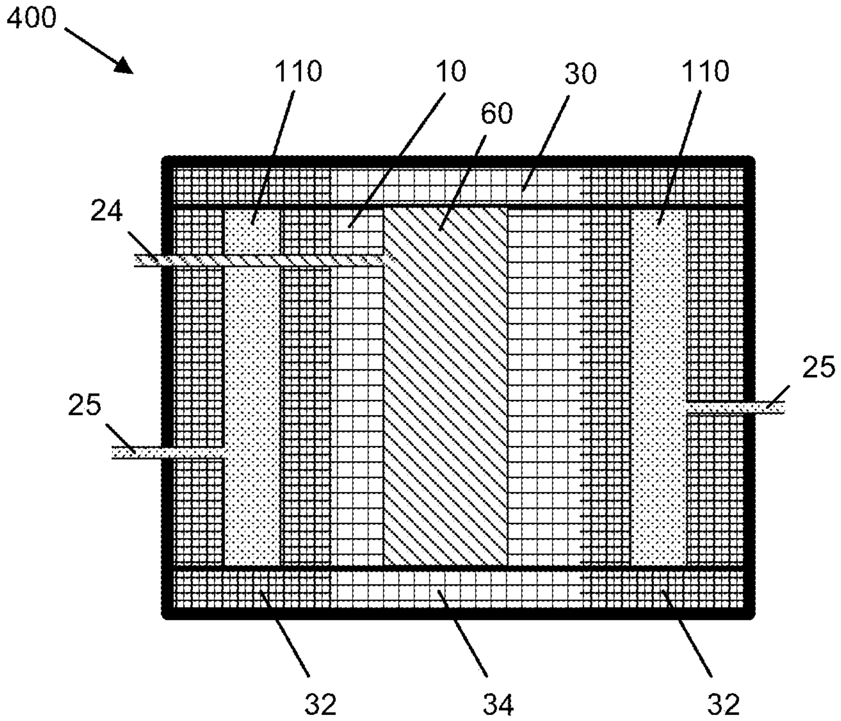
FIG. 4 is a diagram depicting a simplified top perspective view of a MEMS acoustic sensor configured in accordance with various embodiments of the disclosure.

FIG. 4 illustrates another example rectangular MEMS sensor 400 having a membrane 10 and a backplate 30 that can be situated in a similar manner to the sensor 100B shown in FIG. 1B. Like the sensor 100B shown in FIG. 1B, the membrane 10 and backplate 30 of the sensor 400 shown in FIG. 4 can be situated parallel to each other and separated by a gap 40, e.g., as shown in FIG. 3. Additionally like the sensor 100B shown in FIG. 1B, sensing region 110 can have a split electrode configuration with one or more membrane/backplate electrodes, here two membrane/backplate electrodes, formed in portions of the membrane 10 corresponding to sensing region 110. The membrane 10 can also be anchored, clamped, and/or otherwise attached along two sides of the membrane 10 in a similar manner to the sensor 100B shown in FIG. 1B. Additionally, the sensing regions 110 can be electrically coupled to a sensing circuit via a connector 25 in a similar manner to sensor 100B in FIG. 1B.

As further shown in FIG. 4, the backplate 30 of the sensor 400 can include multiple regions, here two first regions 32 and a second region 34. The first regions 32 of the backplate 30 shown in FIG. 4 are located on either side of the sensor 400, i.e., adjacent to respective edges of the membrane 10, and can have holes or perforations of a first size or density. The second region 34 of the backplate 30 is located at a position corresponding to the point of maximum deflection of the membrane 10, i.e., at the center of the backplate 30, and can have holes or perforations of a second size or density that is greater than the first size or density. Stated another way, the first regions 32 of the backplate 30 can be referred to as regions of low hole density, where "density" as used in this manner is defined as a total area of the perforations in the region divided by a total area of the region, and the second region 34 of the backplate 30 can be referred to as a region of high hole density. By utilizing higher hole density in the second region 34 of the backplate 30 compared to the first regions 32 of the backplate 30 in which the sensing regions 110 are located, damping between the membrane 10 and the backplate 30 can be reduced at the first regions 32 of the backplate 30, e.g., due to increased airflow through the backplate 30 at the first regions 32.

In a similar manner to the sensor 100B shown in FIG. 1B, backplate electrodes can be formed into portions of the first regions 32 of the backplate 30, e.g., corresponding to the sensing regions 110, which can form a sensing capacitor that is configured to sense motion of the membrane 10 in response to acoustic pressure. While in the example shown by FIG. 4 the first regions 32 of the backplate 30 and their corresponding backplate electrodes are symmetrically offset from the center of the membrane, e.g., in a similar manner to the backplate electrodes shown in FIG. 1B, it is noted that the first regions 32 and/or their corresponding electrodes could be positioned within the sensor in any suitable manner.

In some implementations, an additional electrode, referred to herein as a shield electrode 60, could be formed into the second region 34 of the backplate 30, or a portion of the membrane 10 situated adjacent to the second region 34 of the backplate 30, and electrically coupled to a circuit via connector 24 to the membrane 10 in order to reduce the electrostatic force acting on the membrane, in turn reducing deflection of the membrane 10. Shield electrodes 60 are described in further detail below with respect to FIG. 15.

Figure 5A:
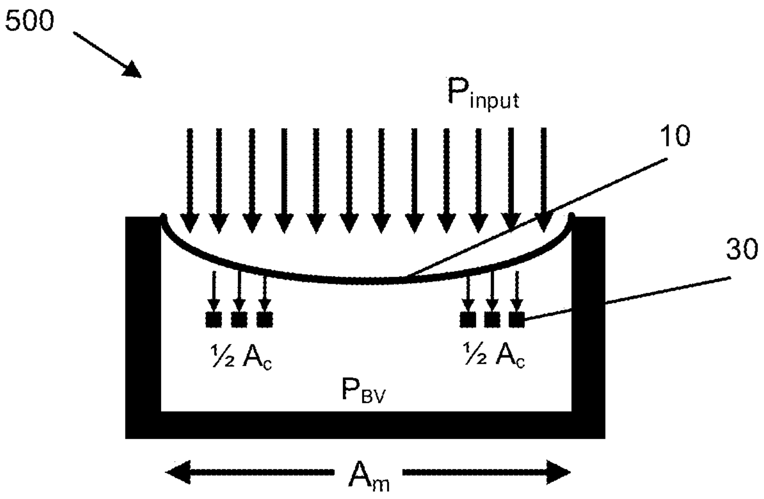
FIG. 5A is a cross sectional diagram depicting response to acoustic pressure in an example MEMS microphone or acoustic sensor as described herein.
Figure 5B:
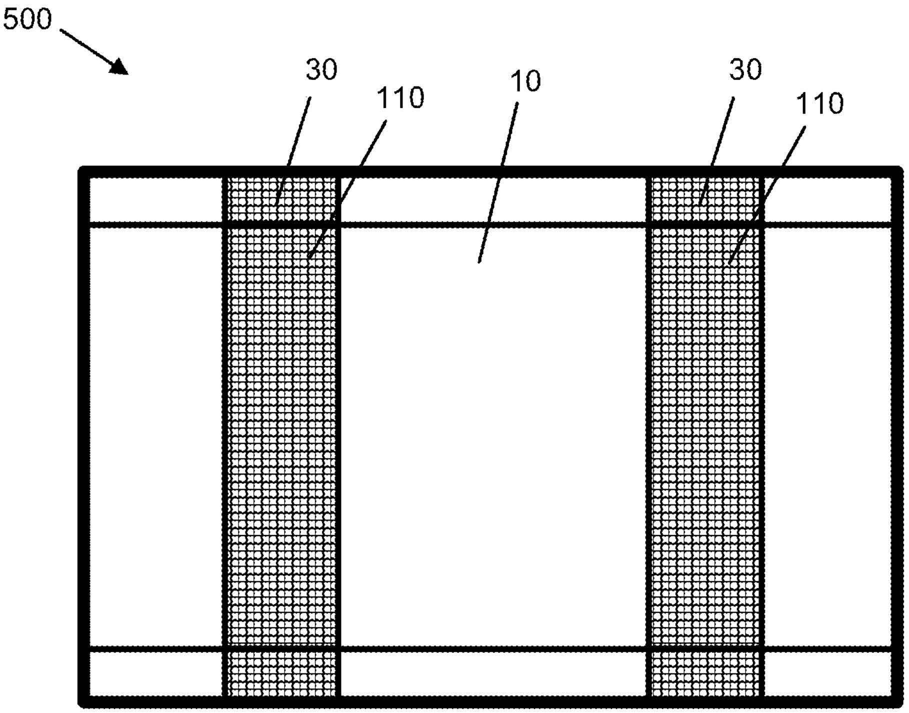
FIG. 5B is a diagram depicting a simplified top perspective view of a MEMS acoustic sensor configured in accordance with the embodiment shown in FIG. 5A.

FIG. 5A illustrates a cross section, and FIG. 5B illustrates a top view, of another example MEMS sensor 500 with a split electrode configuration that includes a membrane 10 that is similar to the membrane 10 shown in FIG. 4. In contrast to the multi-region backplate of the sensor 400 shown in FIG. 4, the high-density perforation region of the backplate is removed, e.g., such that there is a singular opening in the center of the sensor 500 and/or along the sides of the sensor 500 in the manner shown by FIGS. 5A-5B, resulting in two distinct backplates 30. In the example shown by FIG. 5, the entirety of the backplates 30, or substantially all of the backplates 30, can be associated with backplate electrodes such that the sensing regions 110 of the sensor 500 occupy all or substantially all of the area of the backplates 30. In various implementations, the backplates shown in FIG. 5B can be utilized to further reduce damping between the membrane 10 and the backplates 30, while the multi-region backplate shown in FIG. 4 can be used to increase the mechanical robustness of the sensor 400, e.g., in cases of overpressure.

Figure 6:
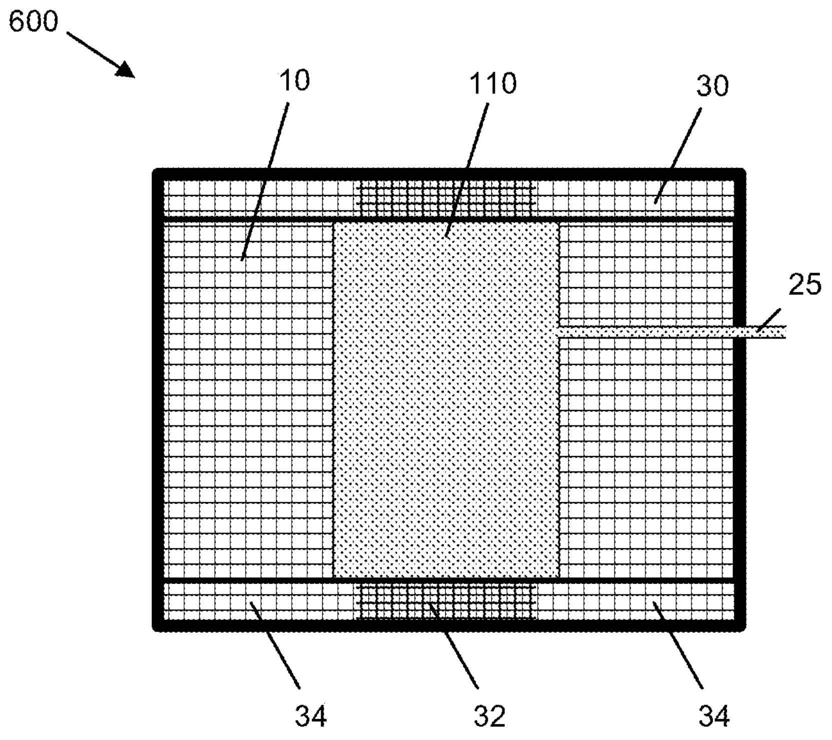
FIGS. 6-8 are diagrams depicting simplified top perspective views of respective MEMS acoustic sensors configured in accordance with various embodiments of the disclosure.

With reference next to FIG. 6, an example rectangular MEMS sensor 600 is depicted that includes a membrane 10 that can be configured in accordance with various embodiments described above. The sensor 600 further includes a backplate 30 having one first region 32 and two second regions 34, e.g., which can include low-density perforations and high-density perforations, respectively, that are similar to those described above with respect to FIG. 4. Here, a membrane electrode is formed into the membrane 10 at an area corresponding to the center of the membrane 10, and a backplate electrode can be formed into the first region 32 of the backplate 30. As shown in FIG. 6, the backplate electrode can extend from the first region 32 of the backplate 30 into a portion of the second regions 34 of the backplate 30, resulting in a sensing region 110 that extends beyond the perimeter of the first region 32 of the backplate 30. The sensing region 110 can be electrically coupled to a sensing circuit via a connector 25 in a similar manner to sensor 100B in FIG. 1B.

Figure 7:
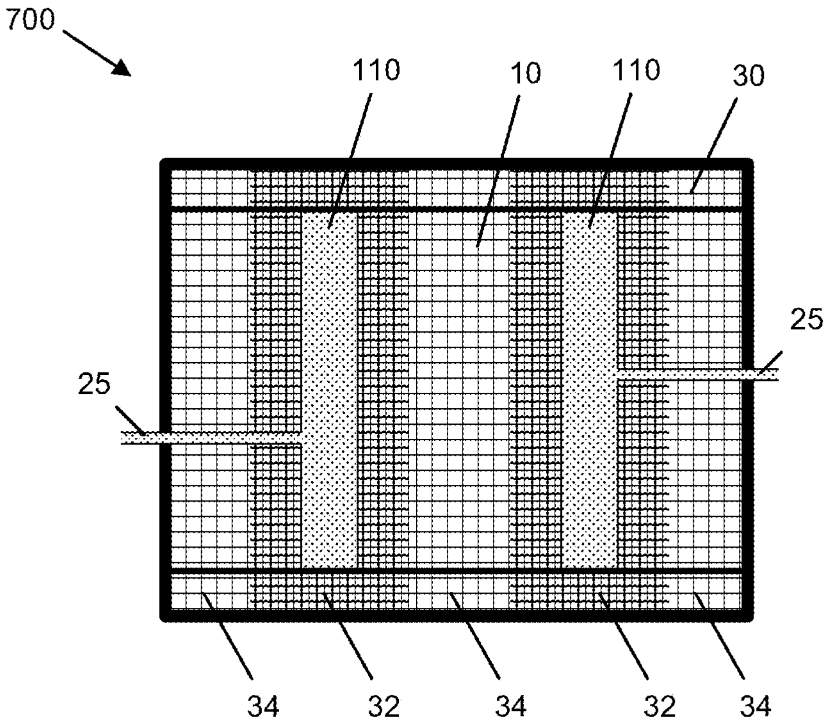

Turning now to FIG. 7, another example rectangular MEMS sensor 700 is illustrated that includes a membrane 10 that can be configured in accordance with various embodiments described above. Relative to the sensor 500 shown in FIG. 5B, the first regions 32 of the backplate 30 of the sensor 700 shown by FIG. 7 are positioned closer to the center of the membrane 10, and additional second regions 34 of the backplate 30 can be situated at the respective edges of the sensor 700. As an alternative to the sensor 700 shown by FIG. 7, one or more of the second regions 34 of the backplate 30 could be replaced by singular large holes or openings, e.g., in a similar manner to that shown by FIG. 5B.

Figure 8:
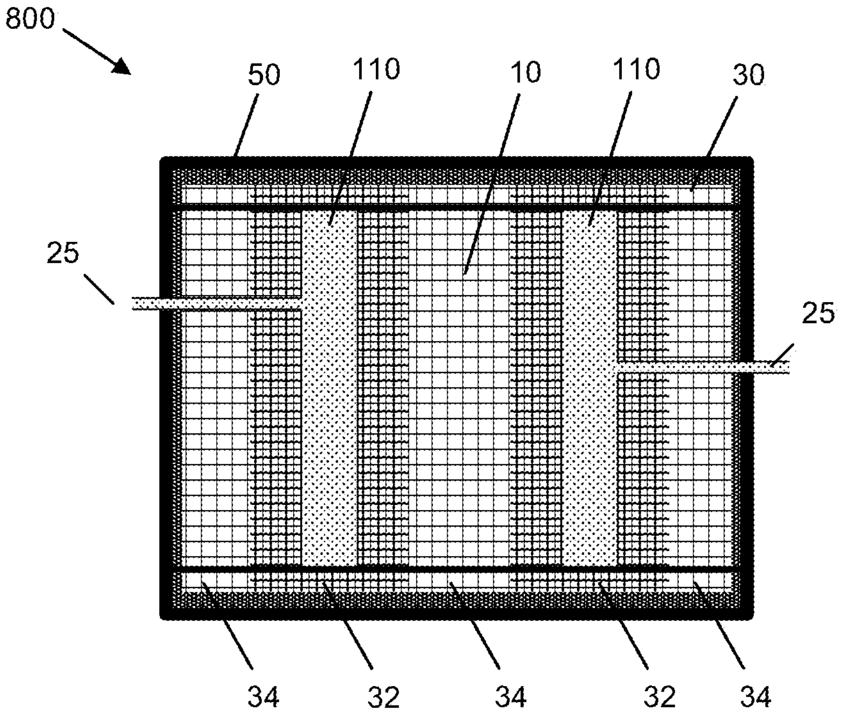

FIG. 8 illustrates a further example rectangular MEMS sensor 800, which can include a membrane 10 and a backplate 30 having first regions 32 and second regions 34 that are similar to those shown by FIG. 7. In addition, the sensor 800 shown by FIG. 8 further includes a section of peripheral holes 50 along a periphery (perimeter) of the backplate 30. The peripheral holes 50 can be smaller than backplate holes associated with the first regions 32 and second regions 34 of the backplate 30, and can be positioned along a perimeter of the backplate 30 to improve stress distribution of the backplate 30 along its edges.

Figure 9:
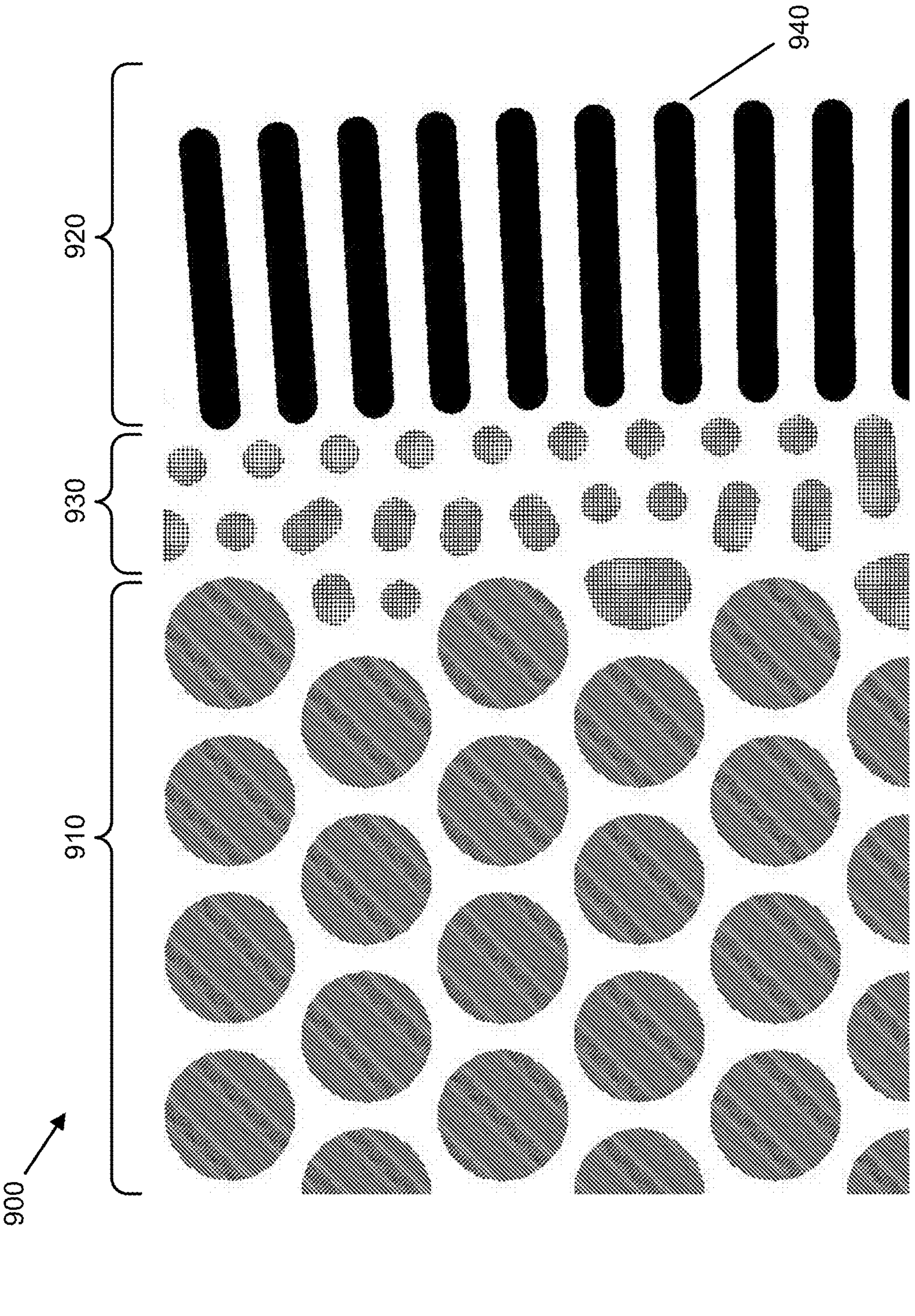
FIGS. 9-10 are diagrams depicting non-limiting aspects associated with an example MEMS acoustic sensor or microphone backplate as described herein.
Figure 10:
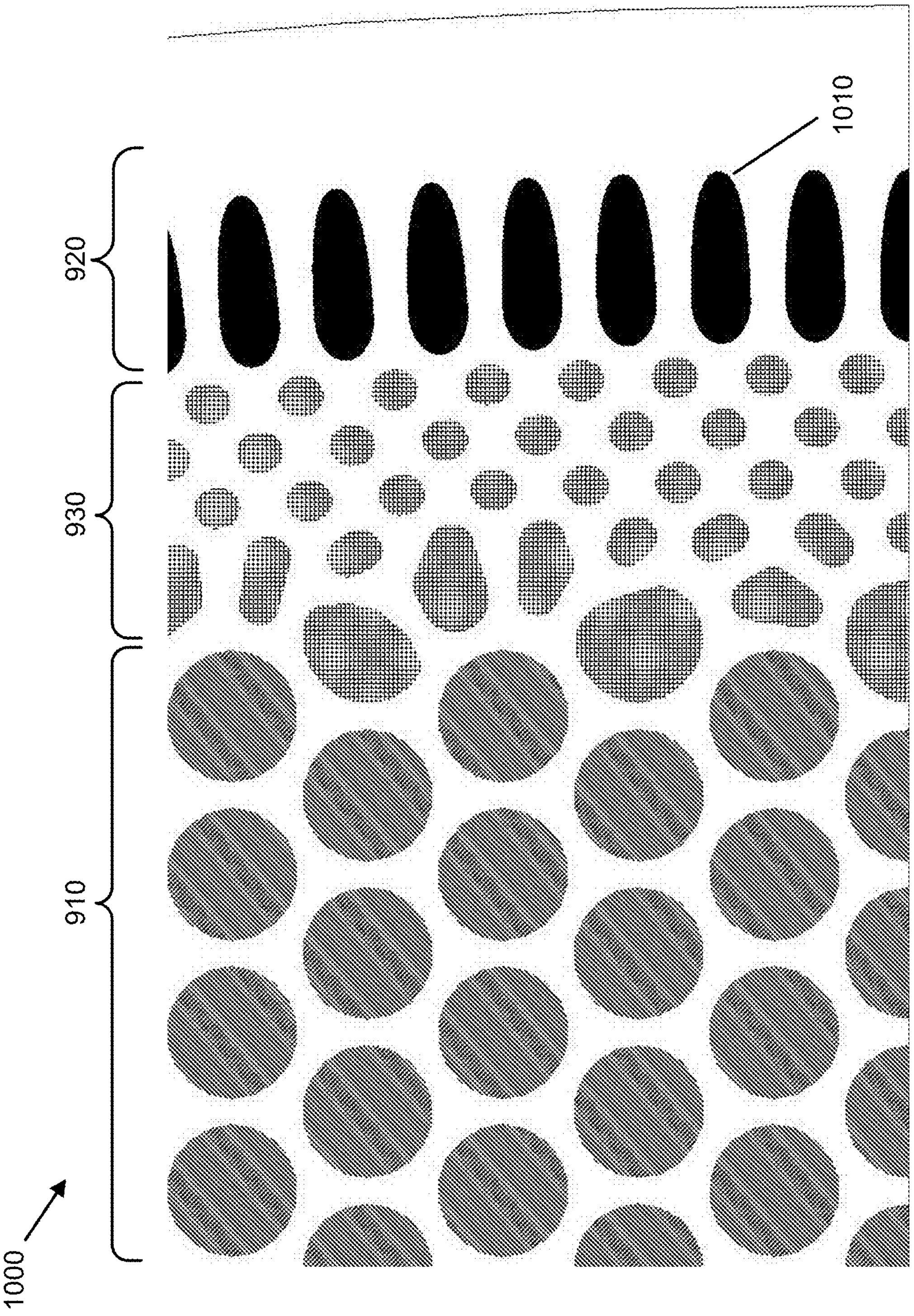

Non-limiting example patterns that can be utilized for the peripheral holes 50 in sensor 800 are depicted by FIGS. 9-10. With reference first to FIG. 9, non-limiting aspects associated with an example MEMS acoustic sensor or microphone backplate 900 are depicted. FIG. 9 illustrates one sector of an example MEMS backplate structure in which the backplate 900 has a center region 910, characterized by a uniform sizing and distribution of larger center holes toward a center of the MEMS acoustic sensor or microphone backplate 900, an edge region 920 characterized by a uniform sizing and distribution of edge pattern (peripheral) holes 940 in a rod-like or capsule-shaped profile for the MEMS acoustic sensor or microphone backplate 900, and a transition region 930 characterized by irregular sizing and distribution of transition holes between the edge region 920 and the center region 910.

FIG. 10 depicts non-limiting aspects associated with a further example MEMS acoustic sensor or microphone backplate 1000 as described herein. FIG. 9 illustrates one sector of an example MEMS backplate structure in which the MEMS acoustic sensor or microphone backplate 1000 includes a center region 910, edge region 920, and transition region 930 that can be arranged in a similar manner to that described above with respect to FIG. 9. Here, the edge region 920 is characterized by a uniform sizing and distribution of edge pattern (peripheral) holes 1010 in a drop-shaped profile for the MEMS acoustic sensor or microphone backplate 1000.

With reference next to FIGS. 11-15, respective examples of generally circular MEMS sensors, e.g., MEMS acoustic sensors, are illustrated. While FIGS. 11-15 illustrate examples of circular sensors, it is noted that similar concepts to those described below with respect to FIGS. 11-15 could also be applied to sensors of any shape with clamped/anchored periphery such as elliptical sensors and/or sensors of any other suitable shape (e.g., square, rectangular, hexagonal, octagonal, etc.) without departing from the scope of this description or the claimed subject matter.

Figure 11:
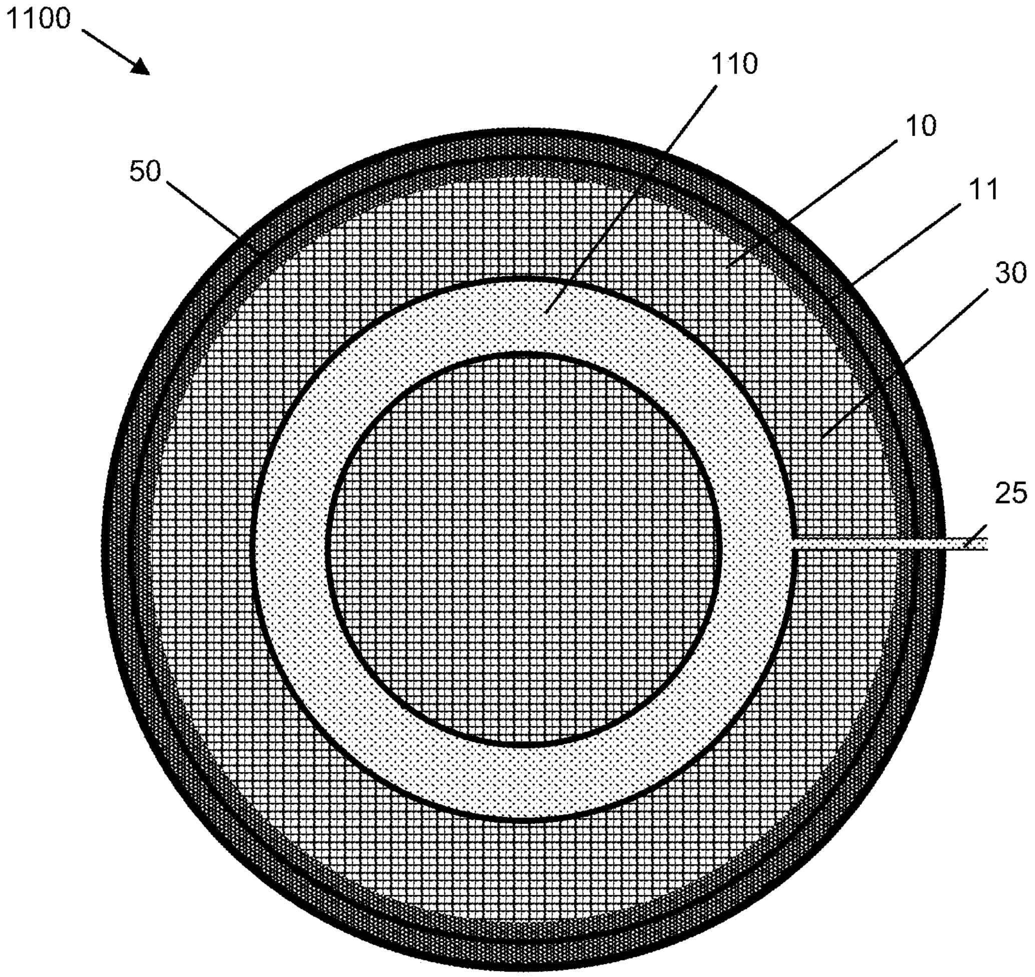
FIGS. 11-14 are diagrams depicting additional simplified top perspective views of respective MEMS acoustic sensors configured in accordance with various embodiments of the disclosure.

Referring now to FIG. 11, an example circular MEMS sensor 1100, e.g., a MEMS acoustic sensor, configured in accordance with various embodiments of the disclosure is illustrated. As noted above, while FIG. 11 illustrates a circular sensor 1100, similar concepts to those shown in FIG. 11 could be utilized for an elliptical sensor, e.g., by utilizing distinct major and minor axes, and/or any other shape having anchored edges. In FIG. 11 and the drawings that follow, the membrane edge is indicated by 11. The sensor 1100 shown in FIG. 11 includes a membrane 10 that can be composed of similar materials, and/or manufactured using similar processes, to the example rectangular sensors described above. Here, the membrane 10 is of the same shape as that of the sensor 1100, e.g., a circular (or elliptical) shape, and can be attached to the sensor 1100 around at least a perimeter of the sensor 1100. While the membrane 10 is illustrated in FIG. 11 as set in from the edge of the sensor 1100 for purposes of illustration, it is noted that the membrane 10 in some implementations could extend fully to the edge of the sensor 1100. Additionally, it is noted that the membrane 10 shown in FIG. 11, as well as the membranes 10 shown in FIGS. 12-15 as will be described in further detail below, are illustrated as transparent for purposes of clarity of illustration in a similar manner to the rectangular sensors described above.

As further shown in FIG. 11, the sensor 1100 includes a backplate 30 that is the same shape as the sensor 1100 and membrane 10. Here, the backplate 30 includes a single region that spans the entirety of the sensor 1100. Multi-region backplates could also be used, as will be described in further detail below. The sensor 1100 shown in FIG. 11 additionally includes peripheral holes or perforations 50 around the perimeter of the sensor 1100, which can include holes that are smaller than the holes of the backplate 30, e.g., as described above with respect to FIGS. 9-10.

Similar to the rectangular sensors described above, respective electrodes can be formed into the membrane 10 and backplate 30, and these electrodes can at least partially overlap in a sensing region 110 that forms a variable sensing capacitor. In the example shown by FIG. 11, the sensing region 110 forms an annulus, i.e., a ring or "donut" shape. It is noted, however, that the sensing region 110 could be of any suitable shape with a removed center portion. Additionally similar to the rectangular sensors described above, the sensing region 110 can connect to a sensing circuit via a connector 25.

Figure 12:
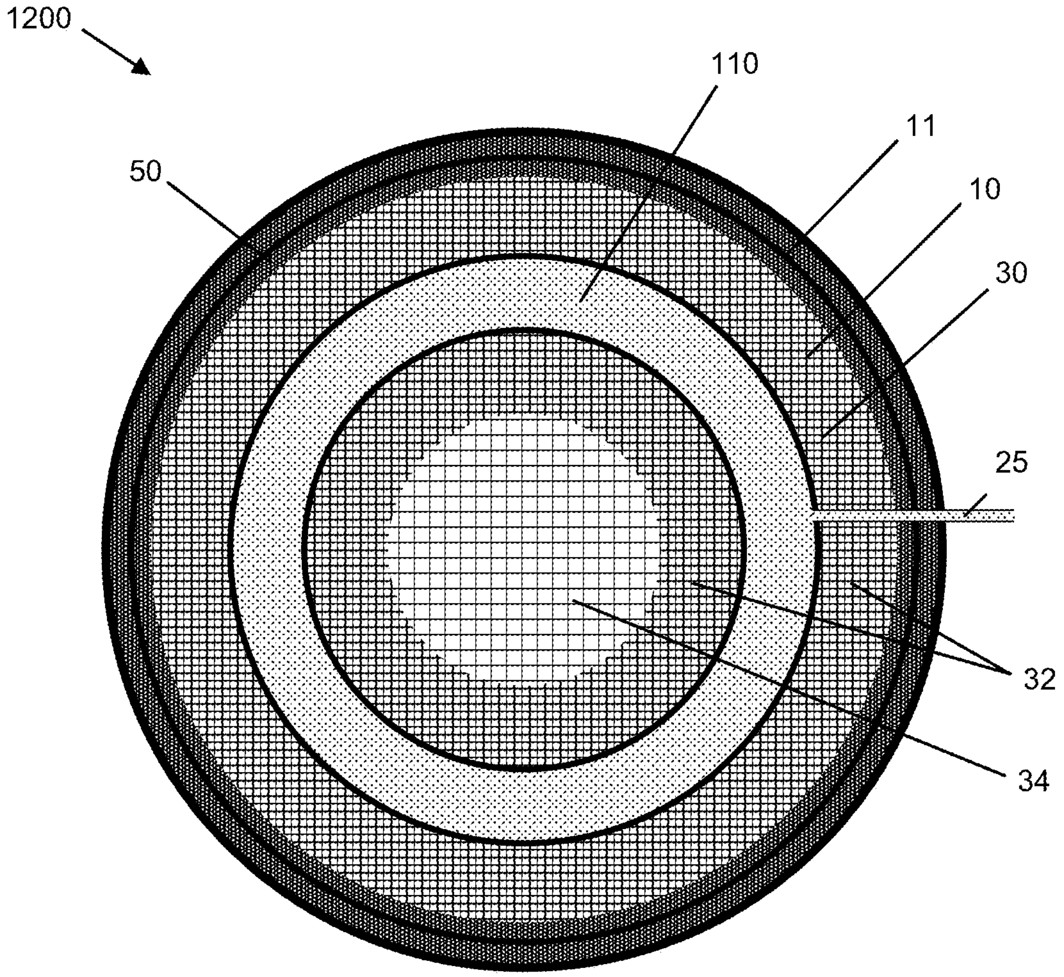

Turning to FIG. 12, another example circular MEMS sensor 1200 is illustrated, which includes a membrane 10 and a backplate 30 with peripheral holes 50 in a similar manner to sensor 1100 described above. Additionally, sensor 1200 as shown in FIG. 12 has an annulus-shaped sensing region 110 that can be formed via membrane and backplate electrodes in a similar manner to sensor 1100. The sensing region 110 can be electrically coupled to a sensing circuit via a connector 25 in a similar manner to sensor 1100 in FIG. 11.

In contrast to sensor 1100 shown in FIG. 11, sensor 1200 has a multi-region backplate 30, which includes a first region 32 of a first hole density positioned around the boundary of the sensor 1200 and on either side of the sensing region 110. The backplate 30 also has a second region 34 of a second hole density that is greater than the first hole density of the first region 32, e.g., as defined based on a total hole area relative to the area of the respective regions. The second region 34 of the backplate 30 can be of the same shape as the sensor 1200, e.g., a circular (or elliptical) shape, and can be positioned adjacent to the center of the membrane 10. The first region 32 of the backplate 30 can occupy the remainder of the backplate 30, e.g., forming a ring around the second region 34 of the backplate 30.

Figure 13:
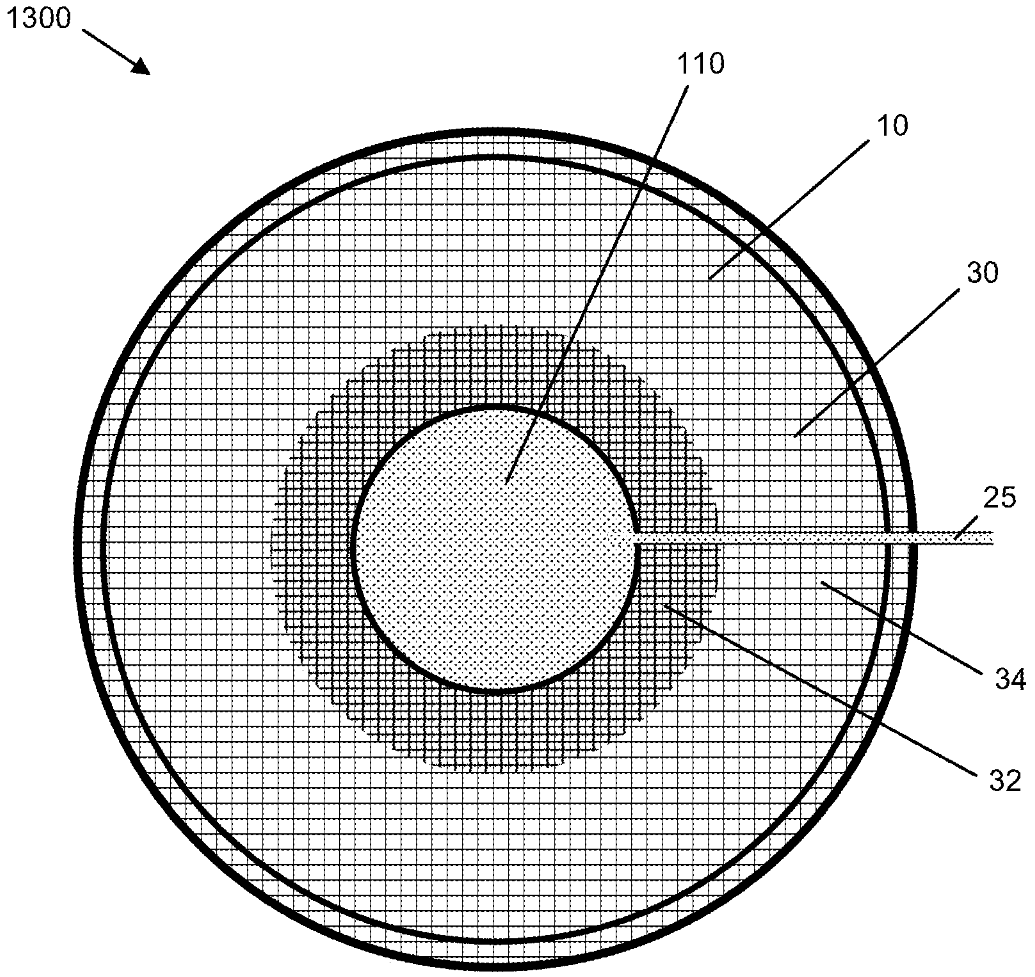

FIG. 13 illustrates an additional example circular MEMS sensor 1300 that can be configured in accordance with various embodiments of the disclosure. The sensor 1300 shown in FIG. 13 includes a membrane 10 and a backplate 30 that can be of the same shape as the sensor 1300 and generally situated within the sensor 1300 in a similar manner to that described above with respect to FIGS. 11-12. While the backplate 30 shown in FIG. 13 does not include peripheral holes 50, it is noted that peripheral holes 50 could be added to the backplate 30 in a similar manner to that described above.

The backplate 30 of the sensor 1300 shown in FIG. 13 includes a first region 32 that is positioned around a center of the sensor 1300 and has comparatively low-density perforations. The backplate 30 additionally includes a second region 34 of comparatively higher-density perforations that traces the perimeter of the sensor 1300, forming a ring bounded by the first region 32 and a perimeter of the sensor 1300. As additionally shown in FIG. 13, substantially circular (or elliptical) electrodes are formed in the membrane 10 and the first region 32 of the backplate 30 at, or near, the center of the membrane 10, forming a circular (or elliptical) sensing region 110 at and/or near the center of the sensor 1300. The sensing region 110 can be electrically coupled to a sensing circuit via a connector 25 in a similar manner to sensor 1100 in FIG. 11.

Figure 14:
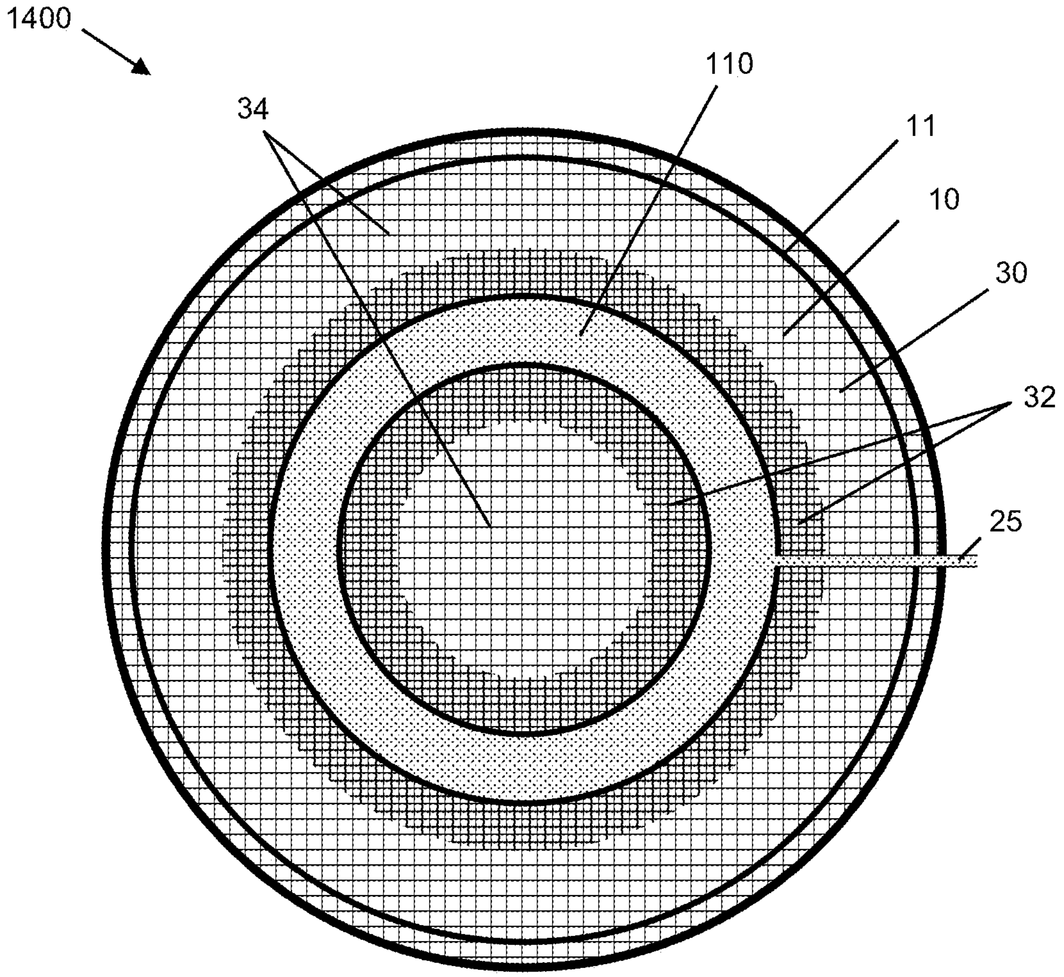

FIG. 14 illustrates still another example circular MEMS sensor 1400 that includes a membrane 10 and a backplate 30 that can be positioned and/or composed in a similar manner to that of the sensors described above with respect to FIGS. 11-13. Here, the backplate 30 includes three regions, namely a first region 32 of low-density holes forming a ring around a center point of the sensor 1300 and two second regions 34 of high-density holes situated in the remainder of the backplate 30. More particularly, the second regions 34 include one region positioned in an area of the backplate 30 that is situated adjacent to the center of the membrane 10, and another region that is positioned in an area that is bounded by the first region 32 of the backplate 30 and a perimeter of the membrane 10. As further shown by FIG. 14, a backplate electrode can be formed into the first region 32 of the backplate 30, which, in combination with a membrane electrode formed into a corresponding portion of the membrane 10, forms an annulus-shaped sensing region 110 that can be similar in shape and/or size to the sensing region 110 described above with respect to FIGS. 11-12. The sensing region 110 can also be electrically coupled to a sensing circuit via a connector 25 in a similar manner to that described above with respect to FIGS. 11-12.

Figure 15:
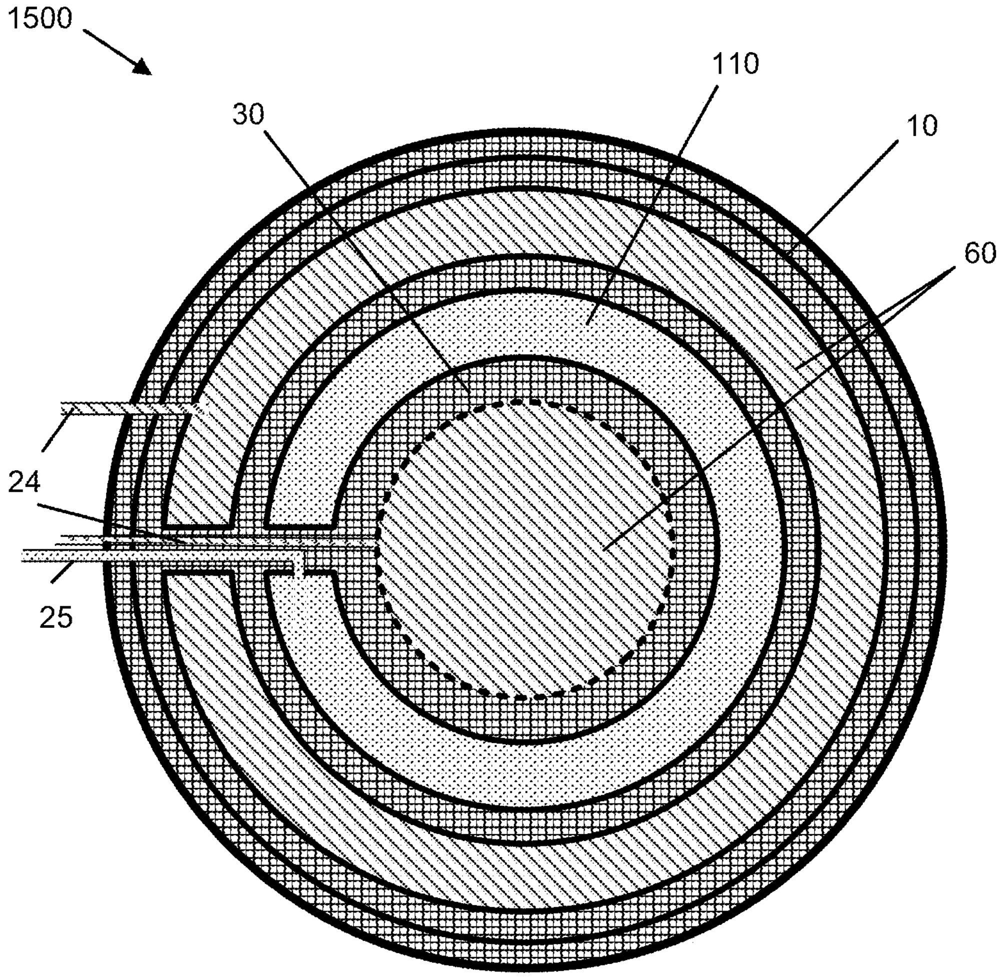
FIG. 15 is a diagram depicting a simplified top perspective view of a MEMS acoustic sensor including a shield electrode as configured in accordance with various embodiments of the disclosure.

Referring next to FIG. 15, a simplified top perspective view of a MEMS acoustic sensor 1500 including a shield electrode 60 as configured in accordance with various embodiments of the disclosure is provided. While sensor 1500 shown in FIG. 15 is circular in shape, it is noted that similar techniques could be used for sensors of any suitable shape, e.g., an elliptical, square or rectangular, hexagonal, octagonal, and/or any other shape. Sensor 1500 as shown in FIG. 15 includes a membrane 10 and a backplate 30, here a single region backplate with holes (perforations) of a uniform density, which can be configured in a similar manner to that described above with respect to FIG. 11. While sensor 1500 is not illustrated in FIG. 15 as including peripheral holes 50, it is noted that peripheral holes 50 could be added to the sensor 1500 as generally described above.

As shown in FIG. 15, one or more shield electrodes 60 can be formed into the membrane 10 and/or backplate 30 of the sensor 1500 in respective areas of the sensor 1500 that exclude the sensing region 110. In the example shown by FIG. 15, two shield electrodes 60 are present, including one substantially circular (or elliptical) shield electrode at, or near, the center of the membrane 10 and a partial annulus-shaped shield electrode that is situated around the perimeter of the sensor 1500.

In an implementation, the shield electrode(s) 60 can be formed into one of the membrane 10 or the backplate 30 and electrically coupled via connector 24 to the other one of the membrane 10 and the backplate 30. Thus, for instance, a shield electrode 60 formed into a portion of the membrane 10 can be electrically coupled to the backplate 30, and a shield electrode 60 formed into a portion of the backplate 30 can be electrically coupled to the membrane 10. This can result in the formation of a shield capacitor at the areas of the sensor 1300 corresponding to the shield electrode(s) 60, which can reduce the amount of deflection of the membrane 10 away from the sensing region 110. As shown in FIG. 15, portions of the sensing region 110 and/or outer shield electrode 60 of sensor 1500 can be removed and/or otherwise omitted to facilitate these electrical connections. In an implementation, the shield electrode(s) 60 can be electrically coupled via connector 24 such that a voltage between the shield electrode(s) and a membrane electrode, or a backplate electrode, is less than approximately ten percent of a bias voltage associated with the sensor 1500 in order to reduce electrostatic force acting on the membrane 10 to reduce deflection of the membrane 10.

While two shield electrodes 60 are shown in FIG. 15, it is noted that an example sensor such as that shown by FIG. 15 could have only one of the illustrated shield electrodes 60 and/or one or more other shield electrodes in configurations not shown by FIG. 15.

Figure 16:
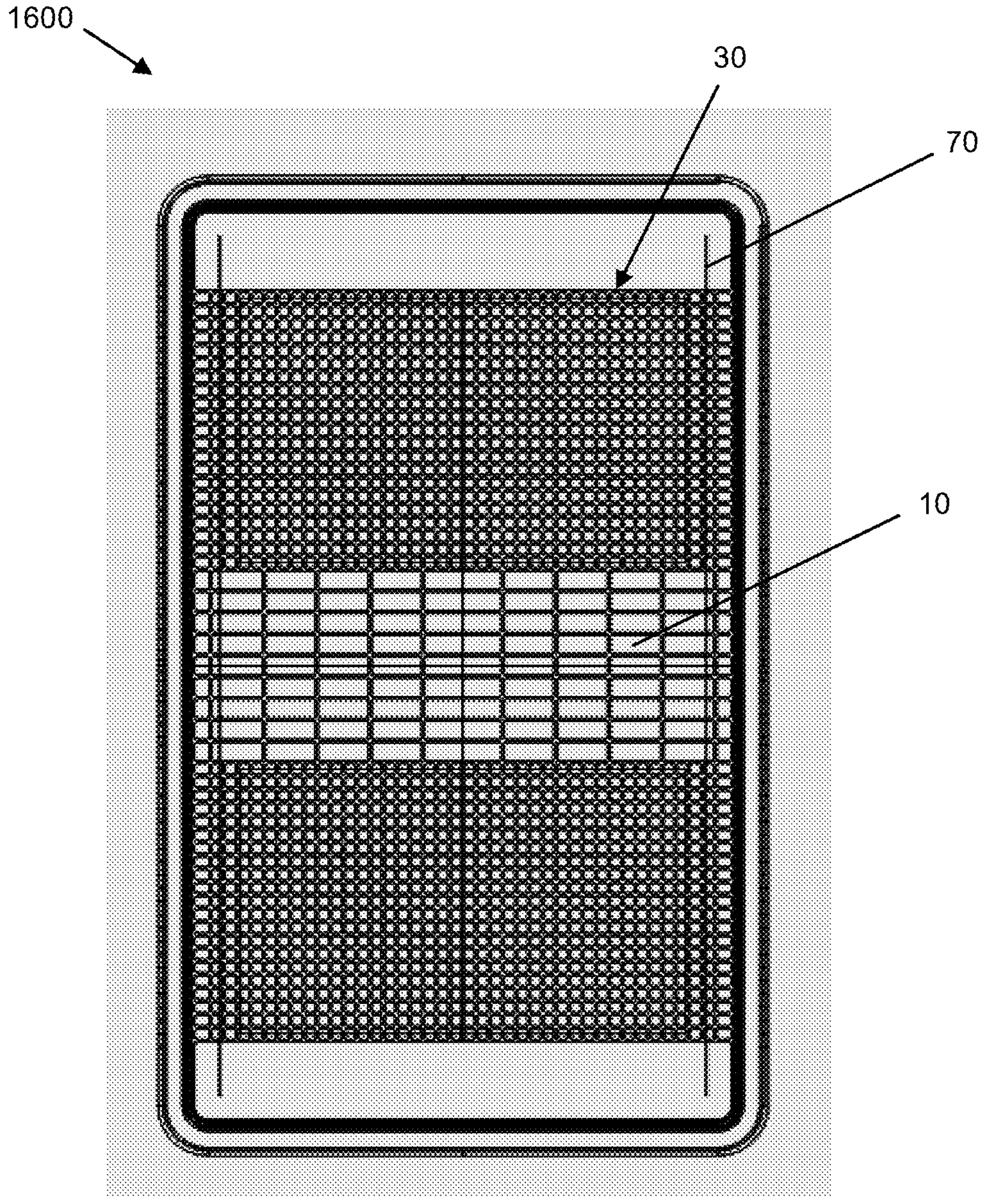
FIG. 16 is a diagram depicting a top perspective view of an example MEMS microphone membrane and backplate configured in accordance with various embodiments of the disclosure.
Figure 17:
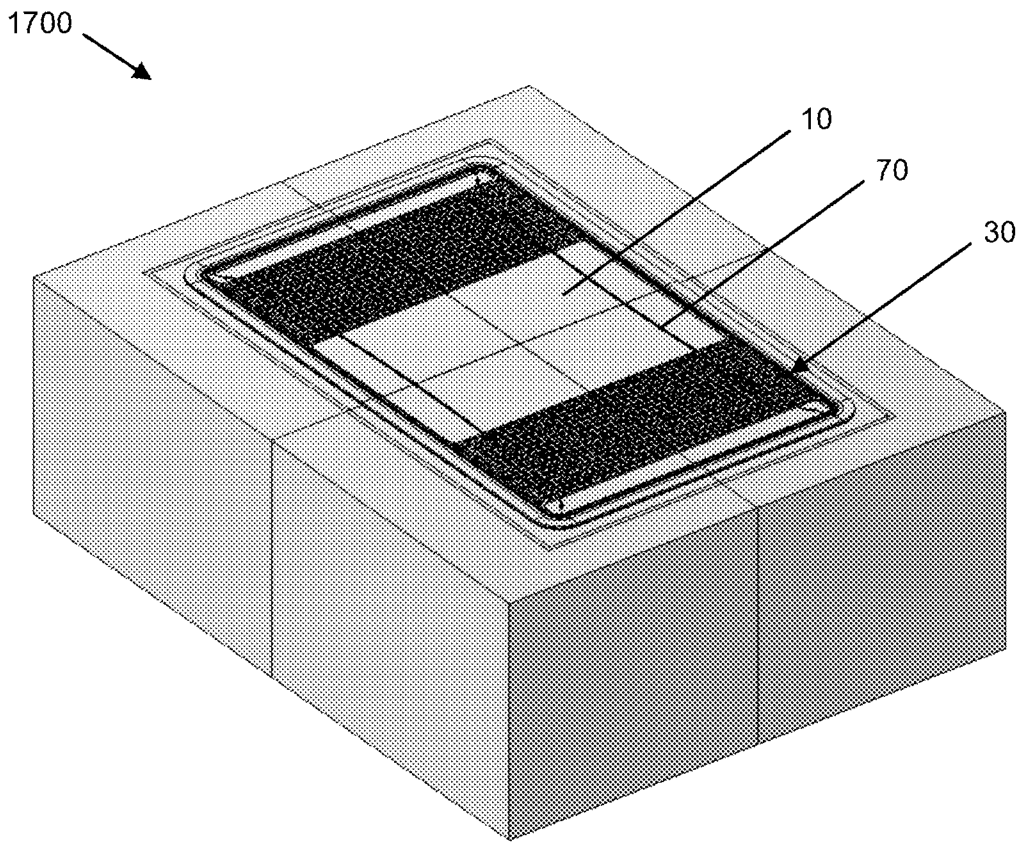
FIG. 17 is a diagram depicting an isometric view of an example MEMS microphone membrane and backplate configured in accordance with various embodiments of the disclosure.

With reference to FIGS. 16-17, respective views of an example MEMS microphone membrane 10 and backplate 30 that can be configured in accordance with various embodiments of the disclosure are shown. FIG. 16 is a top perspective view that shows a backplate 30 having high-density and low-density perforation regions and a membrane 10 that can be placed above the backplate 30, e.g., in an out-of-page direction relative to FIG. 16. In an implementation, the membrane 10 can be anchored and/or clamped at the top and bottom sides of the sensor assembly shown in FIG. 16, and the backplate 30 can be attached to, e.g., the left and right sides of the assembly. As additionally shown by FIG. 16, trenches 70 can be cut and/or otherwise formed into the sides of the membrane 10 in order to separate the membrane portion 10 from the edge regions.

FIG. 17 shows an isometric view of another example MEMS sensor having a backplate 30 with two distinct regions that are separated from each other by a large hole or opening. A membrane 10 is situated above the backplate 30, e.g., in a similar manner to the membrane 10 shown in FIG. 16. The membrane 10 shown in FIG. 17 also includes respective trenches 70, which can be formed into the sides of the membrane 10 in a similar manner to that described above with respect to FIG. 16. While FIG. 16 shows an example of a membrane 10 having substantially linear trenches 70, FIG. 17 shows an example with curved trenches 70.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, in the present specification, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in this specification and annexed drawings should generally be construed to mean "one or more" unless specified otherwise or clear from context to be directed to a singular form.

In addition, the terms "example" and "such as" are utilized herein to mean serving as an instance or illustration. Any embodiment or design described herein as an "example" or referred to in connection with a "such as" clause is not necessarily to be construed as preferred or advantageous over other embodiments or designs. Rather, use of the terms "example" or "such as" is intended to present concepts in a concrete fashion. The terms "first," "second," "third," and so forth, as used in the claims and description, unless otherwise clear by context, is for clarity only and doesn't necessarily indicate or imply any order in time.

What has been described above includes examples of one or more embodiments of the disclosure. It is, of course, not possible to describe every conceivable combination of components or methodologies for purposes of describing these examples, and it can be recognized that many further combinations and permutations of the present embodiments are possible. Accordingly, the embodiments disclosed and/or claimed herein are intended to embrace all such alterations, modifications and variations that fall within the spirit and scope of the detailed description and the appended claims. Furthermore, to the extent that the term “includes” is used in either the detailed description or the claims, such term is intended to be inclusive in a manner similar to the term “comprising” as “comprising” is interpreted when employed as a transitional word in a claim.

What is claimed is:

1. A microelectromechanical system (MEMS) sensor comprising:
- a membrane;
- a membrane electrode formed in a portion of the membrane; and
- a backplate situated parallel to the membrane and separated by a gap, the backplate comprising:
  - a first region of the backplate, wherein:
    - the first region of the backplate has formed therein first perforations of a first density,
    - the first density is a first area of the first perforations divided by a second area of the first region,
    - a backplate electrode is formed in a portion of the first region of the backplate, and
    - a portion of the membrane electrode overlaps a portion of the backplate electrode in a sensing region forming a sensing capacitor, the sensing capacitor being configured to sense motion of the membrane in response to acoustic pressure; and
- a second region of the backplate having formed therein second perforations of a second density, wherein the second density is greater than the first density.

2. The MEMS sensor of claim 1, wherein the backplate electrode comprises a plurality of electrodes.

3. The MEMS sensor of claim 1, wherein the membrane electrode comprises a plurality of electrodes.

4. The MEMS sensor of claim 1, wherein the backplate electrode comprises a portion of the second region of the backplate.

5. The MEMS sensor of claim 1, wherein the backplate electrode is a first backplate electrode, and wherein the MEMS sensor further comprises:
- a second backplate electrode formed in the first region of the backplate, wherein the second backplate electrode is electrically coupled to the membrane electrode.

6. The MEMS sensor of claim 1, wherein the membrane electrode is a first membrane electrode, and wherein the MEMS sensor further comprises:
- a second membrane electrode formed in the first region of the backplate, wherein the second membrane electrode is electrically coupled to the backplate electrode.

7. The MEMS sensor of claim 1, wherein the second region of the backplate is positioned in an area of the backplate that is offset relative to a center of the membrane.

8. The MEMS sensor of claim 1, wherein the second region of the backplate is positioned in an area of the backplate that is overlapping a center of the membrane.

9. The MEMS sensor of claim 1, wherein the backplate further comprises a plurality of first regions, comprising the first region, and wherein respective ones of the plurality of first regions comprise backplate electrodes, the backplate electrodes comprising the backplate electrode.

10. The MEMS sensor of claim 1, wherein the membrane is of a rectangular shape.

11. The MEMS sensor of claim 10, wherein the membrane is anchored or clamped along two sides of the membrane.

12. The MEMS sensor of claim 1, wherein the second region comprises a singular opening.

13. The MEMS sensor of claim 1, wherein the second perforations are larger than the first perforations.

14. The MEMS sensor of claim 1, wherein the first region of the backplate is positioned in an area of the backplate that is situated adjacent to a center of the membrane.

15. The MEMS sensor of claim 1, wherein the second region of the backplate is positioned in an area of the backplate that is located adjacent to at least an edge of the membrane.

16. The MEMS sensor of claim 1, wherein the membrane is of a circular shape or an elliptical shape.

17. The MEMS sensor of claim 1, wherein the first region of the backplate is of a same shape as a shape of the membrane.

18. The MEMS sensor of claim 1, wherein the second region of the backplate is of a same shape as a shape of the membrane and is positioned in a first area of the backplate that is offset relative to a center of the membrane, wherein the first region of the backplate forms a ring around the second region of the backplate, and wherein the backplate further comprises:
- a third region having formed therein the second perforations of the second density, the third region positioned in a second area bounded by the first region of the backplate and a perimeter of the membrane.

19. The MEMS sensor of claim 1, wherein a first perforation density outside the sensing region is greater than a second perforation density inside the sensing region.

20. The MEMS sensor of claim 1, wherein:
- a second portion of the membrane electrode overlaps a second portion of the backplate electrode in a routing region forming a routing capacitor, wherein the routing region provides electrical connection to the sensing capacitor, and
- a first change of a first capacitance of the routing capacitor in response to the acoustic pressure is less than a second change of a second capacitance of the sensing capacitor in response to the acoustic pressure.

21. The MEMS sensor of claim 1, further comprising a third region in the backplate or the membrane, wherein the third region excludes the sensing region.

22. A microelectromechanical system (MEMS) sensor comprising:
- a membrane;
- a membrane electrode formed in a portion of the membrane;
- a backplate situated parallel to the membrane and separated from the membrane by a gap;
- a backplate electrode formed in a portion of the backplate, wherein the membrane electrode at least partially overlaps the backplate electrode in a sensing region forming a sensing capacitor; and
- a sensing circuit coupled to the sensing capacitor and configured to sense motion of the membrane in response to acoustic pressure, wherein the sensing region is situated away from a point of maximum motion of the membrane in response to the acoustic pressure.

23. The MEMS sensor of claim 22, wherein the sensing region comprises a plurality of sensing regions, and wherein the plurality of sensing regions are situated adjacent to respective areas of the membrane that exclude the point of maximum motion.

24. The MEMS sensor of claim 23, wherein each of the plurality of sensing regions is symmetrically offset relative to a center of the membrane.

25. The MEMS sensor of claim 22, wherein the membrane is anchored to first opposing sides of a housing, and wherein the backplate is anchored to at least second opposing sides of the housing, the first opposing sides being orthogonal to the second opposing sides.

26. The MEMS sensor of claim 25, wherein the housing is of a circular, elliptical, rectangular, hexagonal, or octagonal shape.

27. The MEMS sensor of claim 22, wherein the backplate comprises:

peripheral holes along a periphery of the backplate; and backplate holes in a center of the backplate, wherein the backplate holes are larger than the peripheral holes.

28. The MEMS sensor of claim 22, wherein the membrane is clamped at respective edges of the membrane.

29. The MEMS sensor of claim 22, wherein a shape of the sensing region is an annulus.

30. The MEMS sensor of claim 22, further comprising:

a shield capacitor disposed in regions of the MEMS sensor excluding the sensing region, the shield capacitor comprising a shield electrode formed in a portion of the membrane or the backplate.

31. The MEMS sensor of claim 30, wherein the shield electrode is formed in the membrane and is electrically coupled to the backplate electrode.

32. The MEMS sensor of claim 30, wherein the shield electrode is formed in the backplate and is electrically coupled to the membrane electrode.

33. The MEMS sensor of claim 30, wherein a voltage between the shield electrode and the membrane electrode is less than ten percent of a bias voltage.

34. A microelectromechanical (MEMS) acoustic sensor comprising:

a membrane;

a membrane electrode formed in a portion of the membrane; and a backplate situated parallel to the membrane and separated by a gap, the backplate comprising:

a first region of the backplate having formed therein first perforations of a first density;

a second region of the backplate having formed therein second perforations of a second density, wherein the second density is greater than the first density; and a backplate electrode formed in a portion of the backplate, wherein a portion of the membrane electrode overlaps a portion of the backplate electrode in a sensing region forming a sensing capacitor, the sensing capacitor being configured to sense motion of the membrane in response to acoustic pressure, wherein the first region of the backplate encloses a point of maximum motion of the membrane in response to the acoustic pressure, and wherein the second region of the backplate is situated away from the point of maximum motion of the membrane in response to the acoustic pressure.

35. The MEMS sensor of claim 34, wherein the backplate further comprises:

peripheral perforations along a periphery of the backplate, wherein the peripheral perforations are of a lower density than the first perforations and the second perforations.

36. The MEMS sensor of claim 34, further comprising:

a second portion of the membrane electrode overlaps a second portion of the backplate electrode in a routing region forming a routing capacitor, wherein the routing region provides electrical connection to the sensing capacitor, wherein a first change of a first capacitance of the routing capacitor in response to the acoustic pressure is less than a second change of a second capacitance of the sensing capacitor in response to the acoustic pressure.

37. The MEMS sensor of claim 36, further comprising:

a shield capacitor disposed in regions of the MEMS sensor excluding the sensing region, the shield capacitor comprising a shield electrode formed in a portion of the membrane or the backplate.

38. The MEMS sensor of claim 37, wherein the shield capacitor is disposed in regions of the MEMS sensor excluding the routing region.

39. The MEMS sensor of claim 34, wherein the sensing region excludes a periphery of the backplate.

40. The MEMS sensor of claim 1, wherein the sensing region comprises a plurality of sensing regions, and wherein the plurality of sensing regions are situated adjacent to respective areas of the membrane that exclude a point of maximum motion of the membrane in response to the acoustic pressure.

* * * * *